UNITED STATES PATENT OFFICE.

RICHARD P. THOMAS, OF SAN FRANCISCO, CALIFORNIA.

IMPROVEMENT IN THE MANUFACTURE OF SOAP.

Specification forming part of Letters Patent No. 138,712, dated May 6, 1873; application filed October 31, 1872.

*To all whom it may concern:*

Be it known that I, RICHARD P. THOMAS, of the city and county of San Francisco, State of California, have invented or discovered an Improved Process in the Manufacture of Soap; and I do hereby declare that the ingredients used, and the manner of mixing or compounding them to make the said soap, together with the best apparatus known to me for that purpose, are described in the following specification:

My invention or discovery consists mainly in saponifying tallow, fats, and resins at a low temperature by fermentation or chemical agitation in an open vessel, with salty caustic lyes of high strength, without the necessity of running off any of the lye, thereby saving the glycerine in the saponified ingredients.

It is a well-known fact to the manufacturers of soap that great difficulty exists in order to combine tallow in its ordinary state with strong, hot, salty, caustic lyes, and in the ordinary processes the waste lye after being spent is drawn off and thrown away, carrying with it a certain amount of glycerine, which usually causes a loss of from seven to eight per cent. of the ingredients; but in my improved process the whole is retained and utilized, as will hereinafter more fully appear.

To effect this object I combine in proper proportions vegetable and animal fats, and oleic acid, oleine, or the red oil of commerce, the exact proportions of which it would be difficult to give in detail, as much depends upon the character of the fats or tallow to be operated upon.

Ordinarily I employ about one-third part of the vegetable oils or oleine and resins and two-third parts of animal oils or fats.

The oils are melted together with open steam or by fire placed underneath the vat or kettle or other convenient method of melting, sufficient heat being employed to liquefy and melt the ingredients. I now transfer this to any suitable vessel, so arranged that the heat can be readily controlled, which may be accomplished by either a water-bath or a steam-jacket around the sides and bottom of the vessel, or any convenient apparatus, to thoroughly incorporate and mix the strong lye with the fats, after which the product is allowed to repose for a while when fermentation or saponification will take place in a short space of time, yet in some cases it may be necessary to again raise the temperature of the product; but considerable regard must be had to the temperature of the atmosphere, and the locality at which the operation is being carried on, as a mild climate and a high temperature will require less heat than that of a low temperature of the atmosphere.

By this process, and with the apparatus under perfect control of the operator, saponification can be effected in a short time, and a perfect piece of finished soap produced, and the valuable property of the glycerine saved and retained in the soap, which by the old method is lost in the waste lye.

Having thus described my invention, I do not claim making soap by the process known as the cold process, where the lye, fats, and tallow are combined by keeping them at a low temperature, and by which a mechanical union is effected; neither do I claim saponifying under pressure. I do not claim, broadly, saponifying resins by themselves, as described in the yellow or resin soap process, in Morfit's soap and candles, Philadelphia, 1856; but

What I do claim, and desire to secure by Letters Patent, is—

Saponifying vegetable and animal fats, in combination with resins, by fermentation or chemical agitation, in an open vessel, with salty caustic alkalies of high strength, substantially as set forth and described.

In witness whereof I hereunto set my hand and seal.

RICHARD P. THOMAS. [L. S.]

Witnesses:
 C. W. M. SMITH,
 PHILIP MAHLER.